Nov. 17, 1959     R. M. BOVARD     2,913,317
OXYGEN PRODUCING CANISTER
Filed May 21, 1957
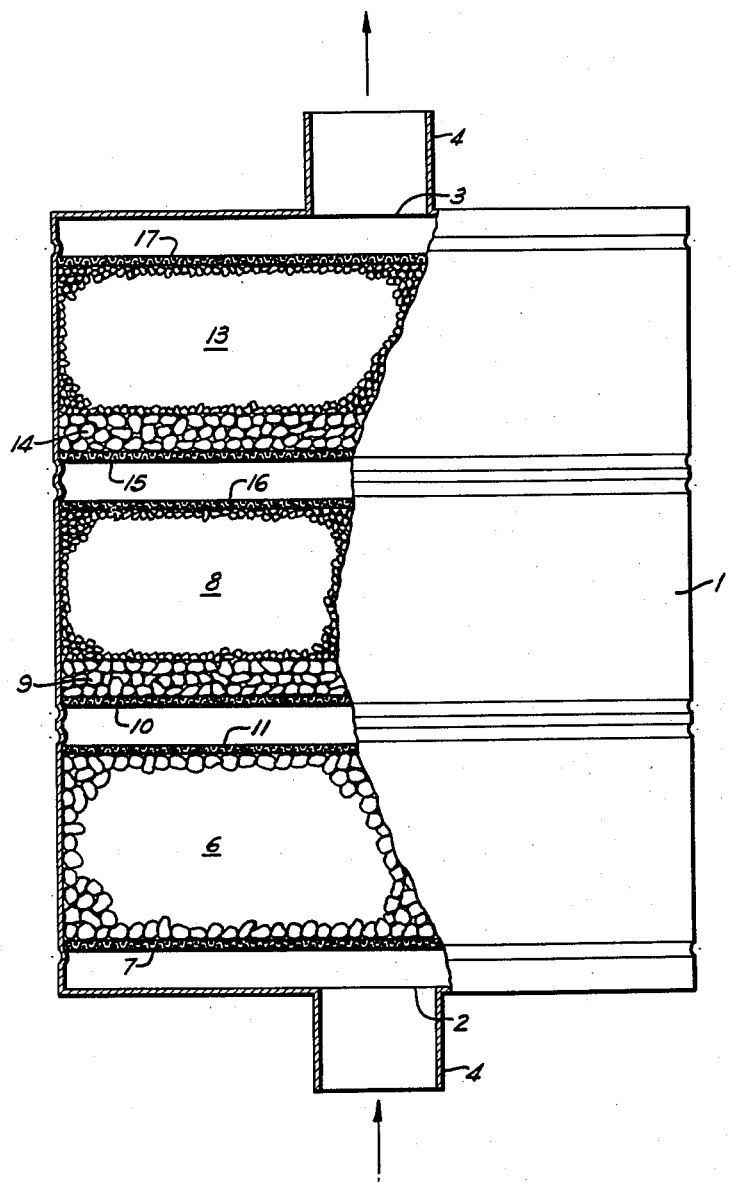
INVENTOR.
ROBERT M. BOVARD
BY
Brown, Critchlow, Flicker Packham
HIS ATTORNEYS

United States Patent Office 2,913,317
Patented Nov. 17, 1959

2,913,317

OXYGEN PRODUCING CANISTER

Robert M. Bovard, Evans City, Pa., assignor, by mesne assignments, to Mine Safety Appliances Company, Pittsburgh, Pa., a corporation of Pennsylvania Application May 21, 1957, Serial No. 660,622

5 Claims. (Cl. 23—281)

This invention relates to breathing apparatus canisters, and more particularly to those containing a chemical that generates oxygen when moistened by the moisture in the breath exhaled by the user.

It is well known that a breathing apparatus canister containing $KO_2$ will absorb carbon dioxide and generate oxygen so that a closed breathing cycle can be used. Difficulties are experienced, however, because of initial high breathing resistance offered by the chemical that is packed in the canister in the form of granules and also because the granules crumble and tend to produce a soupy mass that further increases the breathing resistance so that the canister has a short life.

It is among the objects of this invention to provide a canister of the oxygen-producing type which has a lower pressure drop and operates at a lower temperature than those known before, which has a considerably longer life, and in which most of the chemical granules remain discrete particles.

In accordance with this invention, a breathing apparatus canister housing has inlet and outlet openings. Adjacent the inlet there is a bed of coarse, dense granules of a chemical that will generate oxygen when moistened by the moisture in the breath of the user. A bed of smaller and less dense granules of the same chemical is located between the first bed and the outlet of the housing. For best results, the two beds are separated by an air space between them, and a layer of coarse and dense granules is placed between the second bed and the space just mentioned. All of the beds are solid, which means that they are not provided with by-passes through or around them to permit gas to pass through the beds without contacting the granules therein. Consequently, the first bed intercepts all respiration products entering the canister inlet.

The preferred embodiment of the invention is illustrated in the accompanying drawing, in which the single figure is a side view of my breathing apparatus canister with about half of it shown in radial section.

Referring to the drawing, a conventional metal canister housing, generally cylindrical, is provided in its opposite ends with inlet and outlet openings 2 and 3 that preferably are at the center of the housing. These openings are surrounded by tubular extensions 4 that can be connected to the hoses that conduct exhaled air away from the user and deliver purified air and oxygen to him. The canister is shown provided with three chemical beds, although two may be sufficient in some cases, while in other cases it may be desirable to have more than three beds.

The lower chemical bed 6 is formed from relatively coarse and dense granules of a chemical, such as $KO_2$, which will generate oxygen when it becomes moistened. The material, from which the granules are formed, may be compacted under a pressure of about 1,750 pounds, for example. They most suitably are of sizes between ⅜ inch and ⅝ inch. This bed preferably is spaced from the bottom of the canister a short distance by a screen 7 held in position in any suitable manner. The large granules form a bed having less breathing resistance than would a bed of smaller granules. As the granules are individually dense, they will absorb moisture very slowly, and the absorbed moisture will not cause them to crumble an undesirable amount and become soft. Yet, there is enough moisture in this area of the canister to produce the desired chemical reaction.

The center bed 8 is formed of smaller and less dense granules of the same chemical. They may be between ⅛ and ⅜ inch in size and made from material that has been pressed under about 1,300 pounds pressure. They preferably rest on a layer 9 of coarse dense granules, like those in the lower bed. This layer is supported by a screen 10 spaced from a screen 11 resting on top of the lower bed. The desired chemical reaction is produced in the second bed, even though the amount of moisture present has been reduced, because the granules are small and porous enough to react with the available moisture, whereas there would not be enough moisture to react satisfactorily with large dense granules if the center bed were composed entirely of them.

Due to the fact that the lower bed gets hot during the chemical reaction, it is desirable to prevent, as much as possible, the heat from being conducted to the middle bed. This is the reason for the space between the two beds. Nevertheless, the screen 10 that supports the second bed gets quite hot, and it is to prevent the small granules in the second bed from becoming hot enough to fuse to the screen and plug it that the layer 9 of layer and denser granules is used next to the screen.

The upper bed 13 of granules is formed in the same way as the middle bed and rests on a layer 14 of coarse, dense granules supported by a screen 15 spaced from the upper screen 16 of the middle bed. The top screen 17 on the upper bed is spaced from the top of the canister so that the entire area of the bed will be active.

With this canister the relatively large amount of moisture exhaled into the lower bed is great enough to cause the large dense granules to react and produce oxygen without crumbling into a mushy consistency. By the time the air reaches the middle bed, its moisture content has been reduced to the point where it would not have much effect on large dense granules, so smaller and less dense granules are used. However, due to the reduced quantity of moisture, they will not become so crumbly and mushy as to increase the breathing resistance unduly. The same thing applies to the upper bed. The result is that the canister has a considerably longer life than it would have if it were filled with the smaller granules. If it were filled with only the larger granules, there would not be enough chemical action produced to generate the desired quantity of oxygen. In this canister the chemical reaction is regulated and distributed throughout the canister in accordance with the way it will be used. As a result, as much as 25% longer life is obtained from the same weight of chemical.

I claim:

1. An oxygen producing canister for breathing apparatus, comprising a housing having inlet and outlet openings, a solid transverse bed of coarse and dense granules inside the housing adjacent the inlet opening in a position to intercept all respiration products entering said inlet, and a solid transverse bed of smaller and less dense granules between the first bed and the outlet opening, said granules being a chemical that will generate oxygen when moistened by the moisture in exhaled breath.

2. An oxygen producing canister for breathing apparatus, comprising a housing having inlet and outlet openings, a solid transverse bed of coarse and dense granules inside the housing adjacent the inlet opening in a position to intercept all respiration products entering said inlet, and a solid transverse bed of smaller and less dense granules between the first bed and the outlet opening, spaced screens between the beds forming an air space, and a solid transverse layer of coarse and dense granules between the second bed and the nearest screen, said granules being a chemical that will generate oxygen when moistened by the moisture in exhaled breath.

3. An oxygen producing canister for breathing apparatus, comprising a housing having inlet and outlet openings, a solid transverse bed of coarse and dense granules inside the housing adjacent to but spaced from the inlet opening in a position to intercept all respiration products entering said inlet, a second solid transverse bed of smaller and less dense granules between the first bed and the outlet opening, spaced screens between the beds forming an air space, a solid transverse layer of coarse and dense granules between the second bed and the nearest screen, a third solid transverse bed of granules of substantially the same size and density as those in the second bed, the third bed being located between the second bed and the outlet opening but spaced from that opening, spaced screens between the second and third beds forming an air space, and a solid transverse layer of coarse and dense granules between the third bed and the nearest screen, said granules being a chemical that will generate oxygen when moistened by the moisture in exhaled breath.

4. An oxygen producing canister for breathing apparatus, comprising a housing having inlet and outlet openings, a solid transverse bed of coarse and dense granules inside the housing adjacent the inlet opening in a position to intercept all respiration products entering said inlet, and a solid transverse bed of smaller granules between the first bed and the outlet opening, the density of the granules in the last-mentioned bed being approximately ¾ as great as the density of the granules in said first bed, said granules being a chemical that will generate oxygen when moistened by the moisture in exhaled breath.

5. An oxygen producing canister for breathing apparatus comprising a housing having inlet and outlet openings, a solid transverse bed of coarse granules inside the housing adjacent the inlet opening in a position to intercept all respiration products entering said inlet, and a solid transverse bed of smaller granules between the first bed and the outlet opening, said granules being formed from a chemical material that will generate oxygen when moistened by the moisture in exhaled breath, the granules in the first bed being formed from said material pressed at about 1750 pounds per square inch, and the granules in the second bed being formed from said material pressed at about 1300 pounds per square inch.

References Cited in the file of this patent
UNITED STATES PATENTS

| | | |
|---|---|---|
| 795,678 | Bamberger et al. | Feb. 9, 1905 |
| 2,006,078 | Pyzel | Mar. 23, 1932 |
| 2,469,367 | Burgess | Sept. 17, 1942 |
| 2,664,347 | Rehrig | Oct. 8, 1947 |